Aug. 12, 1930.  D. A. HATHORN  1,772,512
MUSKRAT HOOK
Filed March 19, 1929
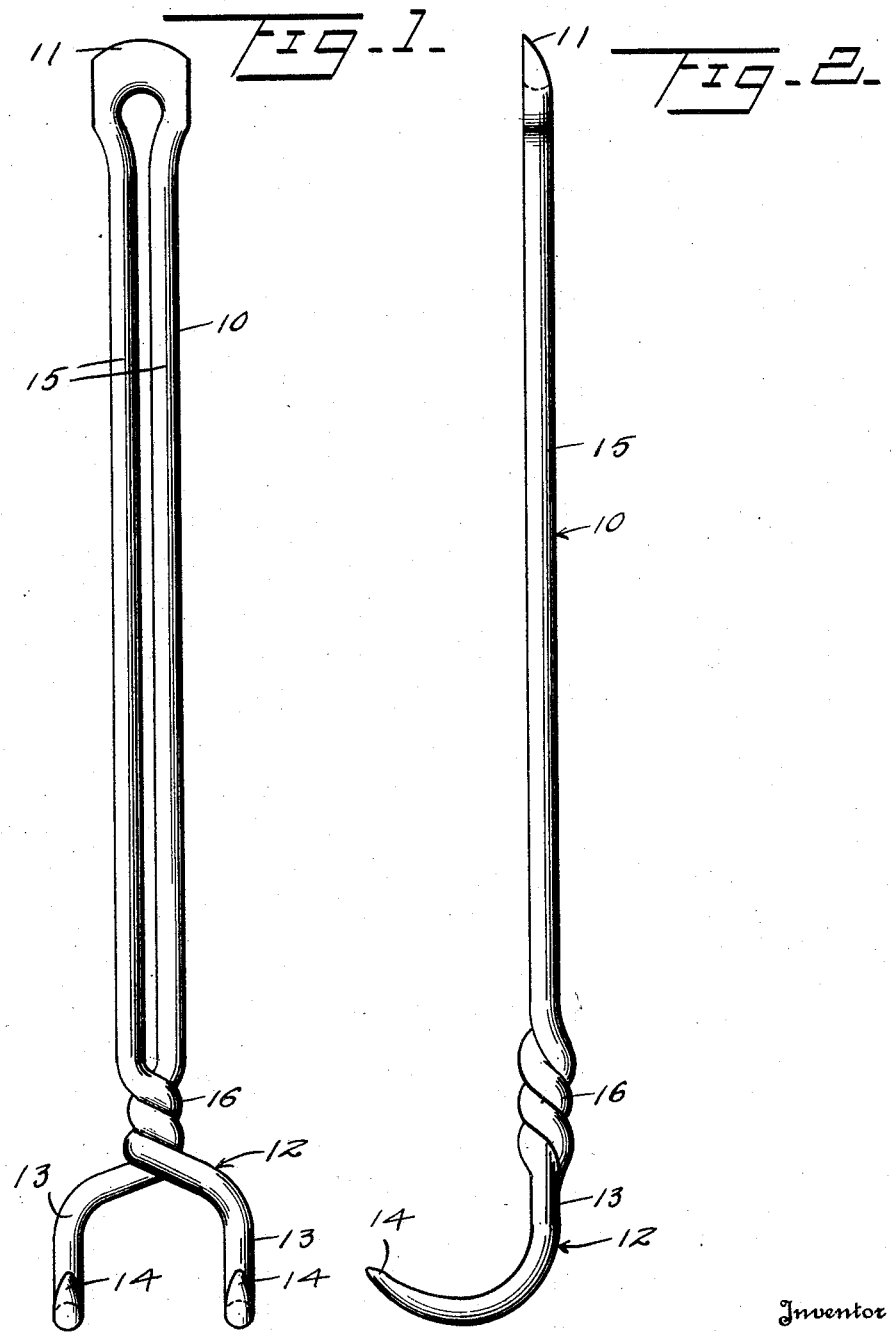
Inventor
D. A. Hathorn
By Watson E. Coleman
Attorney Patented Aug. 12, 1930

1,772,512

UNITED STATES PATENT OFFICE

DENNIE A. HATHORN, OF IRWIN, NEBRASKA

MUSKRAT HOOK

Application filed March 19, 1929. Serial No. 348,236.

This invention relates to trappers' implements and more particularly to an instrument used by muskrat trappers.

An important object of the invention is to combine in a single structure an implement which will serve for digging or prying traps from ice or frozen ground, may serve as a wrecking tool in breaking openings in the walls of muskrat houses, and which will act as a trap or animal hook enabling a trapped animal to be withdrawn from a hole or cavity without danger to the trapper and without damage to the animal.

These and other objects I attain by the construction shown in the accompanying drawing wherein for the purpose of illustration I have shown a preferred embodiment of my invention and wherein:—

Figure 1 is a front elevation of a muskrat hook constructed in accordance with my invention;

Figure 2 is a side elevation thereof.

Referring now more particularly to the drawing, the numeral 10 generally designates a handle formed at one end with a spade or chisel point 11, and at its opposite end with a fork generally designated at 12, the tines 13 of this fork being bent so that they extend in a general plane substantially perpendicular to the handle and are slightly arcuately curved with the concaved faces thereof disposed toward the spade end of the handle. The points 14 of these tines are relatively blunt and the tines themselves are spaced apart a distance such that they may conveniently receive therebetween the bodies of small animals, but are sufficiently closely related that they will not permit projection therethrough of the hips or shoulders of the animal. In other words, the fork tines are adapted to receive therebetween the relatively restricted belly portion of the animal.

It will be obvious that this fork engaged about the body of the animal may be employed to withdraw the animal through an opening as the animal may be kept in engagement with one wall of the opening to prevent its escape from the tines. The blunt ends of the tines, while not sufficiently sharp to injure the fur of the animal are, nevertheless, sufficiently sharp to enable their convenient use in tearing open the wall of a muskrat house or animal den to enable a trap to be placed therein.

The hooks may, of course, likewise be engaged in the jaws of an open trap or in the jaws when closed upon the leg of an animal, provided the body of the animal cannot be conveniently engaged. The spade point may be used for digging ice or frozen dirt from about an embedded trap and in this use, the outer or concaved faces of the tines provide a convenient hand seat or grip.

A tool of this character may be conveniently employed by employing a single length of material which is bent centrally to form parallel runs 15, producing the handle portion. The bight of the bend is flattened and sharpened to produce the spade point 11 and adjacent the ends, the parallel runs are first twisted as at 16, and then spread and bent to produce the tines 13.

This structure may, however, be produced in other manners and I do not wish to be understood as limiting myself to the specific structure illustrated except as hereinafter claimed.

I claim:

A trapper's implement, comprising a handle portion provided at one end with a spade or chisel point and having at its opposite end arcuately curved tines adapted to receive therebetween the body of an animal, said tines being bluntly pointed and being substantially perpendicularly disposed to the handle, said tool comprising a single length of material centrally bent to produce parallel runs, the bight being flattened and sharpened to produce the spade point, the parallel runs being twisted and then spread and bent to produce the tines.

In testimony whereof I hereunto affix my signature.

DENNIE A. HATHORN.